United States Patent [19]
Dedisse et al.

[11] Patent Number: 5,094,106
[45] Date of Patent: Mar. 10, 1992

[54] LIQUID METER FOR FUEL PUMPS

[75] Inventors: Jacques Dedisse, Saint Witz, France; Richard Shunta, North Muskegon, Mich.

[73] Assignee: Bennett Pump Company, Muskegon, Mich.

[21] Appl. No.: 576,856

[22] Filed: Sep. 4, 1990

[51] Int. Cl.$^5$ ................................................. G01F 3/18
[52] U.S. Cl. ..................................................... 73/247
[58] Field of Search ................................. 73/247, 265

[56] References Cited

U.S. PATENT DOCUMENTS

| | | | |
|---|---|---|---|
| 1,270,002 | 6/1918 | Bowser | 73/247 |
| 2,091,912 | 8/1937 | DeLancy | 73/247 |
| 2,718,276 | 9/1955 | Grise | 73/247 |
| 2,746,430 | 5/1956 | Steen | 73/247 |
| 2,760,384 | 8/1956 | Chrisman | 73/247 |
| 4,583,400 | 4/1986 | Nojima | 73/247 |

Primary Examiner—Herbert Goldstein
Attorney, Agent, or Firm—Price, Heneveld, Cooper, DeWitt & Litton

[57] ABSTRACT

A liquid meter for fuel pumps is so designed that the liquid enters through the bottom of the meter and is measured as it passes upwardly through the meter housing and is discharged at the top, which shortens the path the liquid must follow in passing through the meter, makes it possible to reposition the discharge outlet to adjust it to the environment of its installation and adapts the meter to being mounted directly on the discharge port of the pump.

10 Claims, 4 Drawing Sheets

LIQUID METER FOR FUEL PUMPS

FIELD OF THE INVENTION

This invention relates to meters and particularly meters used for measuring fuel as it is being dispensed, such as at a gasoline service station. The invention has an arrangement by which the fuel passes only once through a central entry chamber and then once through one of four measuring chambers and then is passed on to the point where it is dispensed to the customer. This is accomplished by means of a rotating valve which serves as both the inlet and outlet for all of the four measuring chambers. The construction permits the location of the discharge port to be positioned as needed at the time of pump installation.

BACKGROUND OF THE INVENTION

It has long been standard practice to dispense fuels, such as gasoline, through measuring devices utilizing pistons which reciprocate back and forth in a cylindrical chamber with each complete stroke measuring a known unit volume of the liquid. It has been a problem in the past that these devices are truly accurate only for a quite limited portion of their total range of operating speeds. It is one of the objectives of this invention to materially increase the speed range throughout which the meter maintains its accuracy. Another problem with fuel metering devices of this type is that of maintaining accuracy of measurement over a reasonable operating life of the equipment. Wear has always been a serious problem. When the equipment is so made that it is extremely accurate, the equipment has the functional problem of being sensitive to dirt in the fuel and to variations in temperature, among other things. Therefore, all equipment, in effect, has been a compromise between accuracy, length of life and practical functionality in the field.

Another problem which has become increasingly difficult, as service stations have become larger and designed to service a greater number of vehicles simultaneously, has been that of how to maintain and improve accuracy and, at the same time, make the equipment more compact, simpler and more lightweight. It has also become very important to make the equipment capable of adaptation during assembly to the space requirements of the different pump chassis. Thus, it has become very desirable and important to design the unit such that it is capable of being quickly adapted to the requirements of the particular installation.

BRIEF DESCRIPTION OF THE INVENTION

This invention provides a meter which, for the first time, includes a structural design capable of overcoming these problems and shortcomings and, at the same time, is substantially more compact and lighter in weight than most measuring units heretofore available for fuel dispensing stations. It accomplishes this by passing the fuel directly from the pump up through the bottom of the unit into a central chamber from which it passes upwardly and out through the top of the chamber through a rotating valve, which as it passes through a single cycle, opens each of the four chambers in each of which a measuring piston is mounted for reciprocating motion. The action of the valve causes each of the chambers, in progressive order, to be opened to the supply of fuel under pressure, then sealed from the supply and opened to the dispensing channel into which the fuel is discharged by the reverse motion of the piston in the chamber then connected to the outlet. Thus, the fuel makes only one passage through the meter and only a single passage through a chamber containing a metering piston. The unit discharges the measured fuel at the top. At the same time, the construction of the meter is such that the seals between which there is relative motion are so designed that the pressure applied to hold the surfaces in contact and form the seal is only that which is necessary to form the seal since the highest pressures are always maintained on that side of the seal element which will cause the seal element to seat against the surface with which it must seal. This is important in maintaining accuracy.

The meter's design also makes it possible to adapt the location of its discharge port to the particular circumstances of the installation where it is to be used. This is done by locating the circumferential position of the meter's discharge port at the time of assembly by rotating the closure cap to the required position before securing it to the meter's housing.

DESCRIPTION OF THE PREFERRED EMBODIMENT

Figure 1:
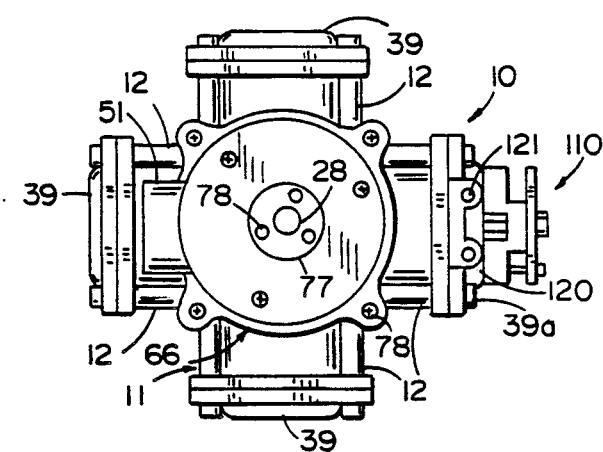
FIG. 1 is a plan view of the meter.
Figure 2:
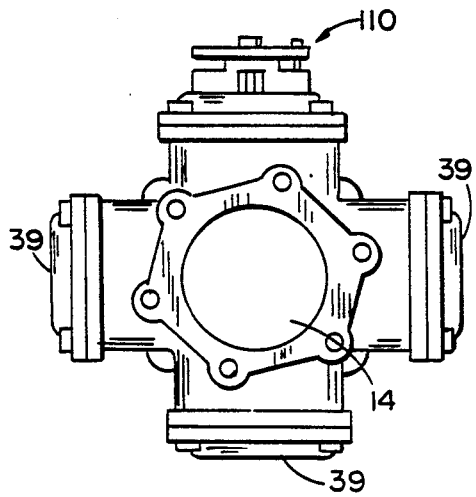
FIG. 2 is a bottom view of the meter.

Referring to FIGS. 1 and 2, the meter 10 has a housing 11 in which there are four measuring chambers 12 arranged at 90° intervals and all of which extend outwardly from a central inlet chamber 13 into which the liquid to be measured is introduced under pressure through an inlet port 14.

Figure 5:
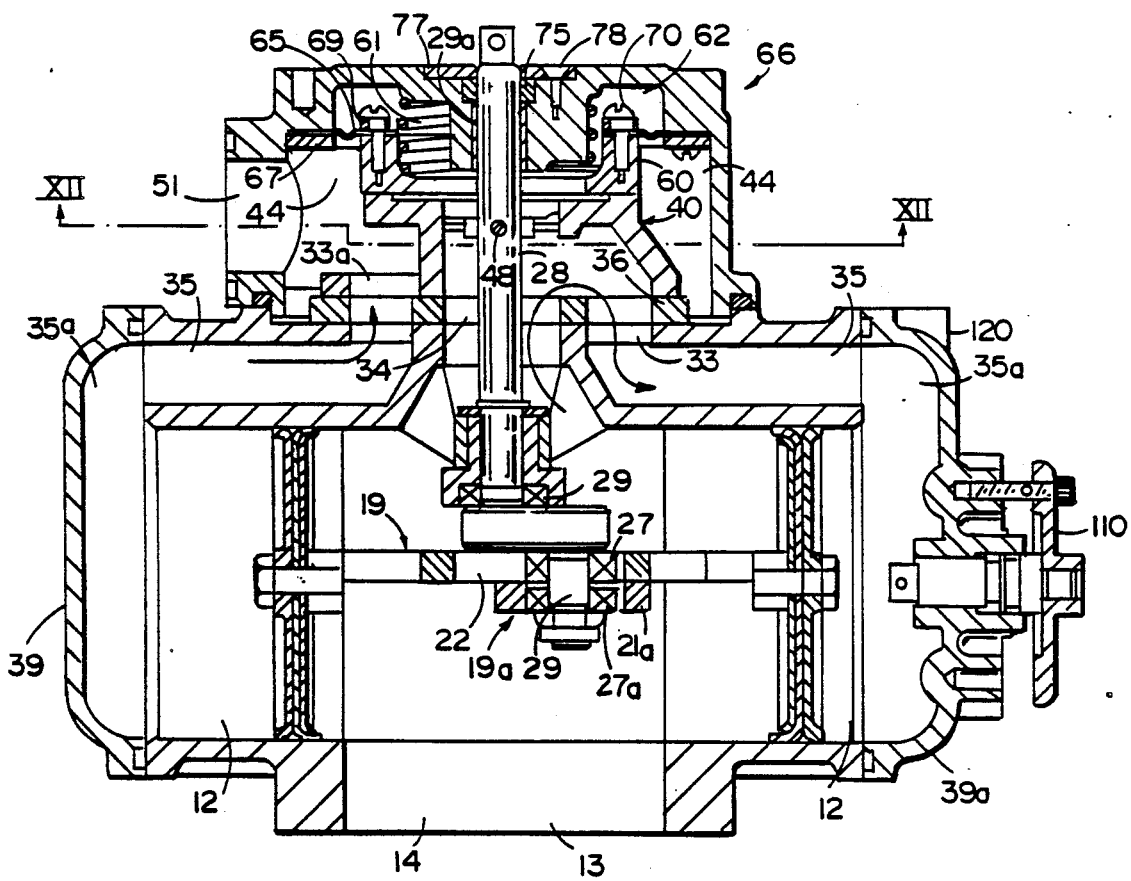
FIG. 5 is a central sectional view of the meter when the left side metering chamber has started to discharge and the opposite metering chamber has started to fill.
Figure 4:
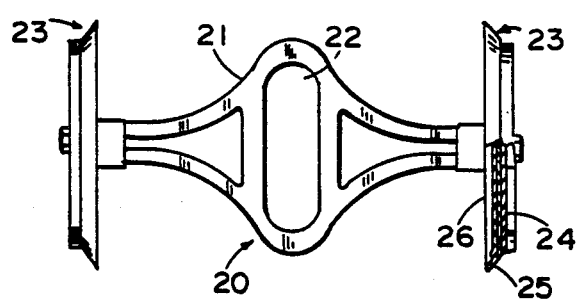
FIG. 4 is a plan view of one of the measuring pistons.

Within the housing 11 are two piston and connecting rod assemblies 19 and 19a which are arranged at right angles to each other (FIG. 5). Each assembly has two identical piston heads 23 (FIG. 4), each one servicing one of a pair of oppositely positioned measuring chambers 12. The piston heads 23 of one pair are secured to the opposite ends of a piston actuator or rod 21 and those of the other pair to the rod 21a (FIG. 5). The piston actuator or rod 21, at its center, has an elongated, transverse, slot-like opening 22. Each actuator has a head assembly 23 at each end and each head assembly has an end plate 24 of just slightly smaller diameter than that of the chamber in which it is seated. Each head assembly has a seal element 25, the periphery of which is bent back toward the housing center for forming a sliding seal with the walls of the measuring chamber 12. The seal is supported on its inner surface by a plate 26. The seal can be of a suitable synthetic material, the choice being governed, to a substantial degree, by the type of liquid to be measured.

The center slot-like opening 22 is transverse to the central axis of the rod or actuator body and embraces a bearing 27 mounted eccentrically on the end of a shaft 28 located at the center of the housing (FIG. 5). A second bearing 27a, axially aligned with the bearing 27, is also secured to the eccentric pin 29. The second bearing is seated in the transverse slot of the second rod 21a, arranged at a right angle to the first actuator. The second actuator mounts pistons for the two measuring chambers which are located 90° from those which have been described. Since all four pistons are thus actuated by a common drive, their operations are coordinated. The shaft 28 is located at the center of the housing, extends away from the inlet port and is supported on the bearings 29 and 29a (FIG. 5).

Figure 6:
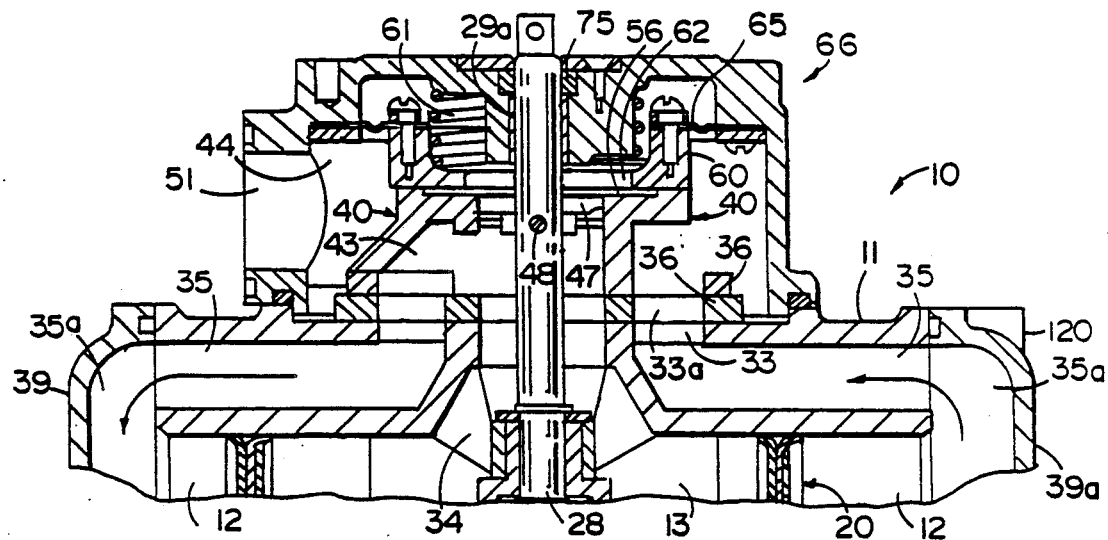
FIG. 6 is a fragmentary, sectional view taken along the same plane as FIG. 5 but illustrating the relationship of the parts of the meter when the left-hand chamber of the meter is filling and the right-hand chamber is discharging.
Figure 7:
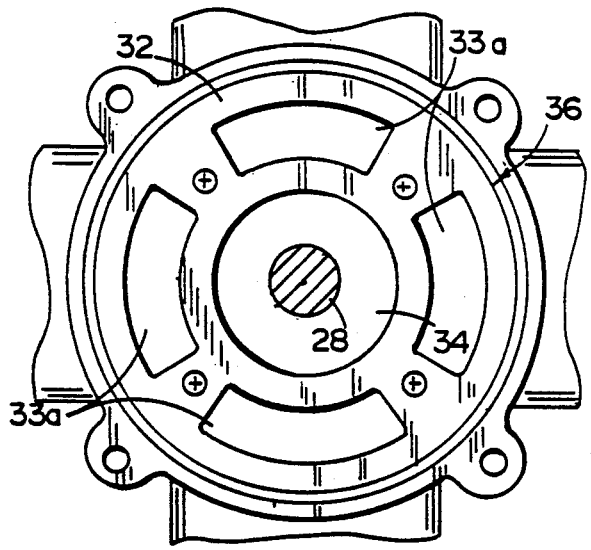
FIG. 7 is a fragmentary plan view of the base for the rotary valve member taken along the plane VII—VII of FIG. 3.

The top of the housing 11 has a central area in which there are four identical ports 33 arranged at equal spacings radially outwardly from and centered about a central passage 34 (FIGS. 5, 6 and 7). The shaft 28 passes upwardly through the central opening. Each of ports 33 communicates with a passage 35 in the housing which is located above and parallels one of the measuring chambers 12, as is typically illustrated in FIGS. 5 and 6. Each passage communicates with one of the measuring chambers 12 through the channel 35a formed by the outward offset in the head plate 39 closing the end of a measuring chamber (FIG. 5). It will be understood that this arrangement of ports, passages and channels is identical for all four measuring chambers 12.

Seated on top of the housing and concentric with the shaft 28 and the central opening 34 is a plate 36 having ports or openings 33a (FIG. 7) corresponding in size, shape and location to that of the openings or ports 33 in the housing (FIG. 5).

Figure 9:
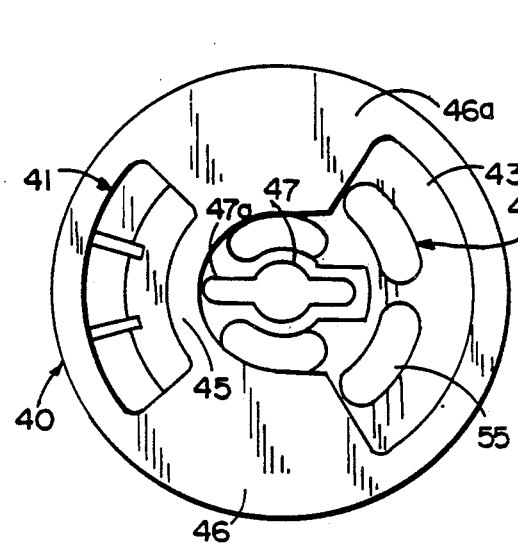
FIG. 9 is a bottom view of the rotary valve member.

Seated on the plate is the valve member 40 (FIGS. 5 and 6). As best seen in FIG. 9, the bottom face of the valve member has two openings 41 and 42. The interior of the valve member is divided by a baffle 45 into an intake chamber 43 connected to opening 42 and a discharge chamber 44 connected to opening 41 (FIG. 9). The baffle is so shaped that the chambers are diametrically located with respect to each other and circumferentially spaced by a pair of unapertured diametrically spaced surfaces 46 and 46a. Each of the surfaces 46 and 46a has a circumferential length slightly greater than that of one of the openings 33a in the plate 36 (FIG. 7). This permits the valve member, as it is rotated, to control the filling and discharge of the measuring chambers 12. The valve member has a central opening 47 for the shaft 28 and by means of a key 48 (FIGS. 5 and 6) which seats in the slot 47a (FIGS. 9 and 12) is made to rotate with the shaft.

Figure 12:
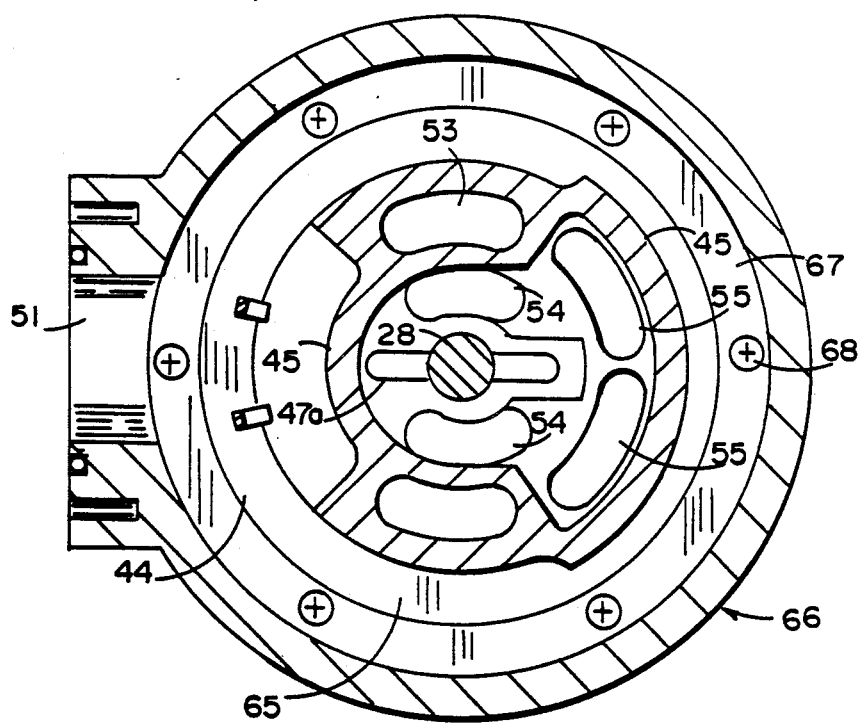
FIG. 12 is a sectional view taken along the plane XII—XII of FIG. 5.

The intake chamber 43 receives the liquid to be metered from the inlet port 13 through the central passage 34 (FIGS. 5, 6 and 7) and discharges it through the passages 35 and 35a into the metering or measuring chambers 12 as the intake chamber 43 communicates with the outer end of one of the measuring chambers 12 through one of the ports or openings 33 and 33a (see left-hand side of FIG. 6). As the valve member 40 is rotated, the intake chamber 43 will be connected, in progressive order, with the intake openings 33 for each of the four measuring chambers 12 (FIG. 6). Simultaneously, the circular discharge chamber 44 which surrounds the valve member 40 will be connected to the measuring chamber located diametrically opposite the one which is being filled. The fluid leaving the chamber 12 being discharged will pass around the valve member 40 by means of the circular passage 44, formed by the closure cap 66, to the discharge port 51 and through this port to the customer (FIGS. 6 and 12).

Figure 10:
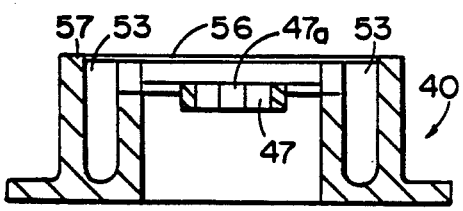
FIG. 10 is a sectional elevation view of the rotary valve member taken along the plane X—X of FIG. 8.
Figure 11:
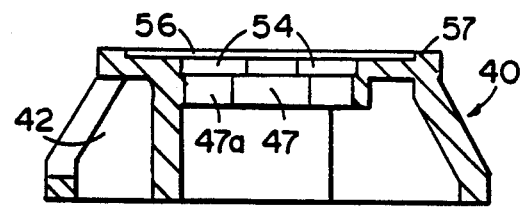
FIG. 11 is a sectional elevation view taken along the plane XI—XI of FIG. 8.
Figure 8:
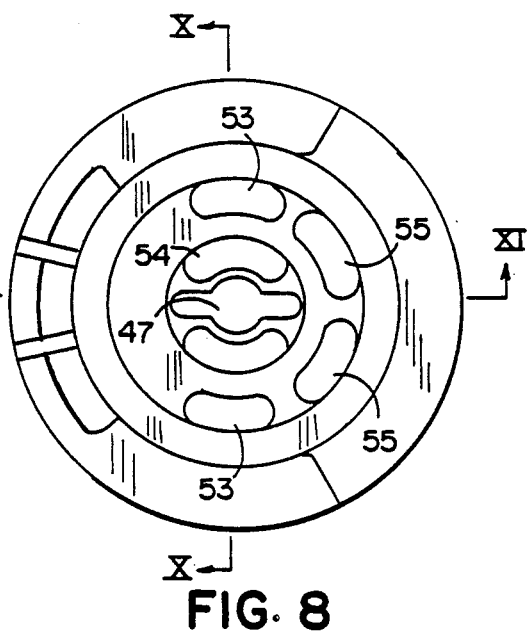
FIG. 8 is a plan view of the rotary valve member.

The valve 40 has two blind openings 53 which do not pass through the valve, as will be observed from comparison of FIGS. 8 and 10. The purpose of these openings is to reduce the mass of the valve member and to maintain substantially uniform wall thickness to facilitate manufacture. The valve 40 also has two openings 54. These, along with openings 55 assure the presence of incoming fuel, thus having the highest pressure, in the recess area 62, above pressure ring 60. The ring is accurately sized to impart a downward hydraulic force on valve member 40 always in excess of the differential upward force on valve member 40, regardless of flow rate through the meter. The lightly loaded bias spring 61 enhances the contact of the pressure ring 60 and the valve member 40 and also between the valve member 40 and the plate 36 during very slow delivery, when pressure differential is low and when the meter is not in use. Such construction provides continuous positive contact of the lapped surfaces of the components 60, 40 and 36, insuring metering accuracy over a broad range of flow.

It is important that each of the openings 41 and 42 have a circumferential length such that, during fill and discharge of the measuring chambers, each of these openings communicates with two adjacent ones of the openings 33a. Thus, the meter effects a continuous filling and discharge of the liquid, eliminating the pulsing which would result from isolated operation of each port.

The upper or smaller end of the valve member 40 seats against the pressure ring 60 (FIGS. 5 and 6). The spring 61 acts against the pressure ring 60 to hold the valve member 40 firmly against the plate 36. The upper end of the valve member, when seated against the pressure ring 60, provides an internal chamber 62. This chamber 62 communicates with the intake chamber 43 surrounding the shaft 28 and thus provides fluid pressure cooperating with the spring 61 to a seal between valve member 40 and the valve seat or plate 36.

The upper end of the pressure ring 60 is secured to the inner edge of a flexible diaphragm 65, the outer edge of which diaphragm is secured to the closure cap 66 by a clamping ring 67 and screws 68 (FIG. 12). The inner edge of the diaphragm is secured to the pressure ring 60 by an annular member 69 and fasteners 70 (FIG. 5). The internal chamber 62 at the upper side of the diaphragm communicates with the central passage in the valve member. The diameter of the upper surface at the pressure ring 60 exposed to the pressure of the incoming fuel is at least equal to the area of the lower surface of the valve member 40 subjected to the upwardly acting fluid pressure. Thus, the downward pressure required of the spring 61 need be minimal to provide an effective seal The upper end of the shaft 28 projects beyond the top of the cap 66 and is surrounded by a seal 75 where it passes through the cap. The seal 75 is retained by the plate 77 and screws 78 (FIGS. 1 and 5) The outer end of the shaft is connected to means capable of monitoring its rotation and thus producing a record of the total quantity of liquid which has passed through the meter.

The valve member 40 is preferably molded of aluminum with a subsequent hardcoat and polytetrafluoroethylene surface treatment for several reasons. The hardcoat and polytetrafluoroethylene surfaces are neutral in the presence of the hydrocarbon fluids for which the meter is specifically designed. Aluminum is also lightweight, therefore, reducing the amount of inertia and momentum which must be overcome in the valve's operation. This contributes to accuracy, particularly at very low flow rates. The hardcoat and polytetrafluoroethylene surface also has a low coefficient of friction, reducing the energy necessary to drive the valve member. This further contributes to the meter's accuracy, particularly when combined with the single passage, upward flow-through arrangement.

The meter is operated by the fuel being dispensed. The difference in pressure between fuel entering the meter from the pump and the back pressure exerted by the fuel between the meter and the discharge nozzle through which the fuel is dispersed provides the sole force to operate the meter. Thus, the greater the rate of discharge of the fuel into the customer's tank, the greater the pressure differential and the faster the meter will operate.

The fuel entering the meter through the inlet port 14 entirely fills the center of the housing between the measuring chambers and the central passage surrounding the shaft 28. As soon as a fuel dispensing valve or nozzle is opened, the pressure on the outlet side of one of the measuring chambers will be reduced, upsetting the pressure balance which was established when no fuel was being demanded. This pressure differential will permit the pressure of the fuel entering through the inlet port 14 to shift outwardly the piston of the one of the measuring chambers then connected to the discharge port thus initiating the metering operation. In doing this, the fuel only passes through the central chamber once because it passes directly from that chamber into one of the measuring chambers and from there is discharged from the meter. As a result of this construction, the unit is substantially more compact than known meters of similar capacity. It is important to this operation that, at all times, at least one of the measuring chambers is in communication with the discharge port and the measuring chamber diametrically opposite from it is in communication with the inlet port. This is necessary to prevent the meter becoming stalled because a demand for liquid at the discharge port could, under proper circumstances be isolated from all four measuring chambers.

By introducing the liquid to be metered at the bottom and discharging it from the metering chambers at the top of the meter and relatively close to the center of the meter, it became possible to so design the meter that it could be adjusted to discharge in any one of several, preferably four, directions. This has not been possible in previous fuel meter designs because the circumferential relationship between the fuel inlet and outlet orifices of the meter were not capable of change. Further, this invention makes this type of adjustment one which can be made quickly and easily at the point of installation without use of special parts or tools. All that has to be done with the meter of this invention is to remove the screws 78 (FIG. 1) which retain the closure cap 66 and rotate the cap to locate the discharge port 51 in the desired position. While the closure cap 66, as illustrated and described, is capable of only four positions, by increasing the number of bolts 78 to permit the cap to be placed in any one of six or eight positions, the adaptability provided by this invention can be increased. In the installation of modern fuel dispensing stations, this is very important because their complexity and size leaves very little space to accommodate the complex piping necessitated by meters of fixed directional discharge. Not only does it simplify installation, it greatly reduces manufacturing complexity and inventory control.

Another feature which contributes substantially to the versatility of this invention is that of introducing the fuel through the inlet port 14 at the bottom center of the meter. This arrangement permits the meter to be installed directly to the discharge of the pump. This not only reduces cost, it also materially reduces both the cost of the overall assembly and cost of labor required to install. It also contributes to conservation of space by making the entire installation substantially more compact.

This invention provides a high degree of accuracy over a wide range of fuel flow rates. This adds to the desirability of the invention in controlling income from the fuel passing through the meter. It also makes the meter acceptable even under circumstances in which great accuracy is required. In the range of approximately 5 gallons to 20 gallons per minute delivery, the variation from total accuracy is less than 0.0590 percent and, throughout most of this range, it is substantially less than this. Even at the extreme ends of the operating range of the pump, the maximum error does not exceed 0.2 percent.

The construction of the meter uses the pressure of the fuel to provide adequate sealing. Because the valve member 40 is pressed against the plate 36 by both the spring 61 and the pressure of the incoming fuel, the pressure which the spring 61 must exert can be materially less than would otherwise have been necessary to effect a seal against the plate 36. This reduces the force necessary to initiate and halt rotation of the valve member 40, making the valve more sensitive to operating conditions and thus more accurate. It also reduces friction and wear. This contributes to the valve's ability to accurately respond to a wide range of operating conditions.

One of the chambers is equipped with means 110 for adjusting the stroke length of one of the pistons 20. This is a micro-adjustment and is used to compensate for variations between one meter assembly and another. Since the total quantity of fuel collectively measured by all four pistons in a single revolution of the shaft 28 is a minor portion of a unit of volume used in dispensing the fuel, the adjustment of stroke length effective in one piston is effective to adjust the overall accuracy of the meter's output. This arrangement is conventional and, while used with this invention, is not part of the invention.

Figure 3:
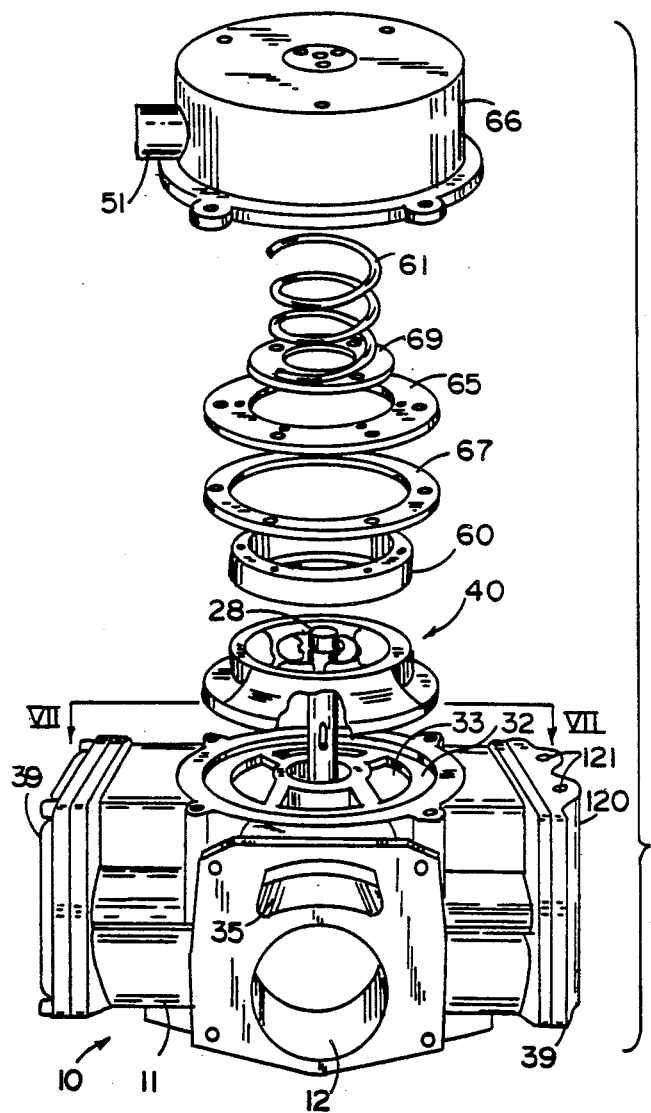
FIG. 3 is an exploded, oblique view of the meter.

One of the head plates 39 has means for monitoring the temperature of the liquid being metered. For this purpose, the head plate 39a has a boss 120 provided with a pair of openings 121 (FIGS. 1 and 3). Preferably, these are in the same head plate as the stroke adjustment means, but this is not essential. To provide access to the fuel, the openings 121 are provided. In normal operation, one is plugged while the other is used to mount a temperature sensing probe extending into the fuel path. As fuel is metered, the sensor measures its temperature and through auxiliary electronic equipment (not part of this invention), the volume and monetary values are displayed relative to a predetermined fuel temperature setting is used as a norm. The second opening is a test well used periodically during testing of the meter's Automatic Temperature Compensation (ATC) accuracy. An inspector inserts a thermometer into the test well and measures the fuel temperature during the meter test and compares his results with the standards of the ATC system.

Having described a preferred embodiment of the invention, it will be understood that various modifications of the invention can be made without departing from the principles of the invention. Such modifications are to be considered as included in the hereinafter appended claims unless these claims by their language expressly state otherwise.

We claim:

1. A meter for measuring the quantity of liquid being passed under pressure therethrough, said meter having a housing, said housing having a central chamber with a fluid inlet port at the bottom thereof and four equally spaced measuring chambers arranged in a circle about said central chamber and extending radially outwardly therefrom, a rotatable shaft centered in said chamber with its central axis normal to the central axes of said measuring chambers, a piston reciprocally mounted in each measuring chamber and crank means connecting all of said pistons to said shaft eccentrically thereof; said housing having mounted on top thereof a circular valve member secured to said shaft for rotation therewith, said valve member being enclosed by a stationary cap having a radially extending external discharge port, said cap forming an annular passage for liquid surrounding said valve member communicating with said discharge port; a separate conduit individually connecting each measuring chamber to said valve member, said valve member having a first passage for fluid receiving from said central chamber, said first passage being connected by said valve member sequentially with each of said conduits whereby fluid can enter into each of the measuring chambers, said valve member having a second passage isolated from said first passage communicating sequentially with each of said conduits for receiving fluid sequentially from each of said measuring chambers and discharging it to said discharge port, said valve member as it is rotated causing fluid to enter each measuring chamber sequentially and to be sequentially discharged therefrom in a precisely measured quantity through said discharge port.

2. A meter as described in claim 1 wherein said fluid inlet port is coaxial with said valve member.

3. A meter as described in claim 1 wherein a compression spring is mounted within said cap and compressed between said cap and said valve member for holding said valve member against said housing.

4. A meter as described in claim 3 wherein means including a flexible diaphragm encloses said spring and isolates it from the fluid in the annular passage surrounding said valve member whereby fluid from said central chamber passing through said valve member's central opening can occupy the area within said spring and cooperate with said spring for holding said valve member against said housing.

5. A meter as described in claim 1 wherein said cap has a base portion seated against said housing, said base portion being symmetrical about its central axis, said cap surrounding said valve member and being radially spaced therefrom; detachable uniformly spaced fastener means for securing said cap to said base portion arranged in a symmetrical pattern about the cap's central axis whereby the cap can be secured to the housing with the axis of said discharge port extending radially in any one of as many radial positions as there are openings in said housing for said fastener means with which the cap can be aligned to receive means for securing the cap to the housing.

6. A meter as described in claim 5 wherein four equally spaced openings are provided for fasteners in both the cap and the housing whereby the cap can be positioned with said discharge port in any one of four circumferential positions.

7. A meter as described in claim 1 wherein the base of said cap seated against said housing and the means of its attachment to the housing are symmetrical about said shaft whereby said discharge port can be circumferentially located by repositioning said cap on said housing.

8. A meter for measuring the quantity of liquid being passed under pressure therethrough, said meter having a housing, said housing having a central chamber and four equally spaced measuring chambers arranged in a circle about said central chamber and extending radially outwardly therefrom, a rotatable shaft centered in said chamber with its axis normal to the central axes of said measuring chambers, a piston reciprocally mounted in each measuring said valve member sequentially with each of said conduits whereby fluid can enter into each of the measuring chambers, said valve member having a second passage isolated from said first passage communicating sequentially with each of said conduits for receiving fluid sequentially from each of said measuring chambers and discharging it to said discharge port, said valve member as it is rotated causing fluid to enter each measuring chamber sequentially and to be sequentially discharged therefrom in a precisely measured quantity through said discharge port.

9. The meter as described in claim 8 wherein an annular pressure ring is seated against one end of said valve member and positioned between said spring and said valve member and providing a passage for liquid to pass therethrough and act against said pressure ring in cooperation with said spring.

10. A meter as described in claim 9 wherein a flexible annular diaphragm member is provided, said pressure ring being secured to said diaphragm member and surrounding the opening therein, said diaphragm member at its periphery being secured to said cap and forming a seal between liquid in said first and second passages.

* * * * *

UNITED STATES PATENT AND TRADEMARK OFFICE
CERTIFICATE OF CORRECTION

PATENT NO. : 5,094,106
DATED : March 10, 1992
INVENTOR(S) : Jacques Dedisse et al.

It is certified that error appears in the above-identified patent and that said Letters Patent is hereby corrected as shown below:

Col. 4, Line 23:
"regardless" should be --irregardless--

Col. 8, Lines 36-46:
Delete from "said" to the end of the claim and substitute --chamber and crank means connecting all of said pistons to said shaft eccentrically thereof; said housing having mounted on top thereof a circular valve member secured to said shaft for rotation therewith, said valve member being enclosed by a cap having a radially extending external discharge port, said valve member having a first passage for fluid received from said central chamber, said first passage having a central portion extending axially therethrough and isolated from said discharge passage, each of said measuring chambers being individually connected to said valve member by a separate conduit through which fluid can enter into and be discharged from the measuring chamber, said valve member having a second passage isolated from said first passage and sequentially connected to each of said conduits for receiving sequentially from each of said measuring chambers and discharging it to said discharge port; means including a spring co-axial with said shaft and acting against said valve member for urging said valve member to seat against said housing--

Signed and Sealed this

Seventh Day of December, 1993

*Attest:*

BRUCE LEHMAN

*Attesting Officer*  *Commissioner of Patents and Trademarks*